Sept. 26, 1944.  R. I. SCHONITZER ET AL  2,358,832
SHEET METAL NUT
Filed Oct. 6, 1942
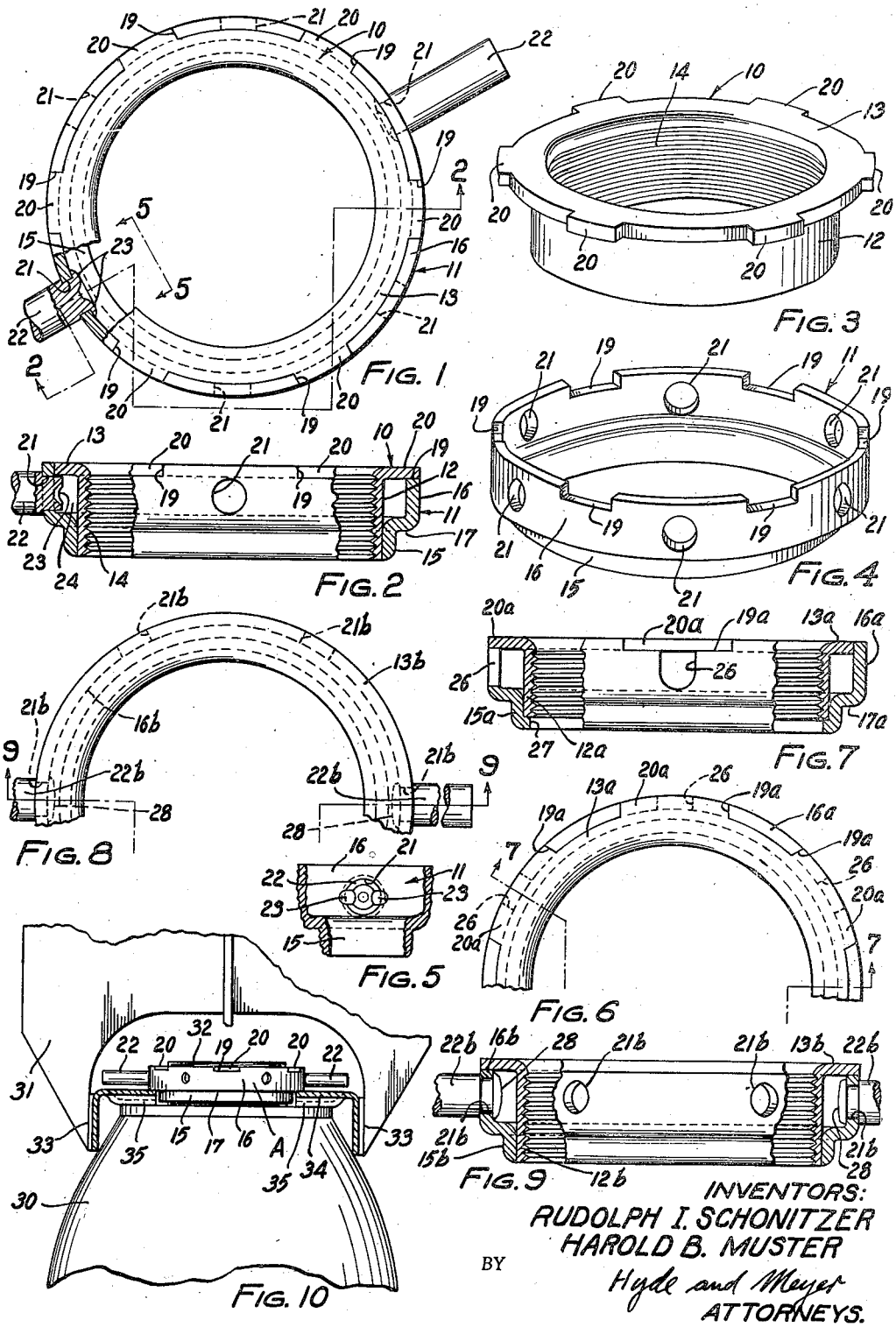
INVENTORS:
RUDOLPH I. SCHONITZER
HAROLD B. MUSTER
BY
Hyde and Meyer
ATTORNEYS.

Patented Sept. 26, 1944

2,358,832

UNITED STATES PATENT OFFICE 2,358,832

SHEET METAL NUT

Rudolph I. Schonitzer, Shaker Heights, and Harold B. Muster, Avon Lake, Ohio; said Muster assignor to said Schonitzer Application October 6, 1942, Serial No. 460,928

20 Claims. (Cl. 85—32)

This invention relates to improvements in sheet metal nuts, the invention having for its general object the provision of a strong, sturdy and durable nut capable of being rapidly and inexpensively fabricated from sheet metal by well-known stamping and forming operations.

A further object of the present invention is the provision of a nut which comprises a pair of simple and inexpensive telescopically related sheet metal members, the inner member being internally threaded for the reception of a bolt, bushing or other externally threaded element and the outer member having a transverse shoulder for contact with the object to be held or retained and also having means, such as wrench-receiving openings, to facilitate turning of the nut in its application and removal.

A further object of the present invention is the provision of a nut in which the two telescopically related sheet metal members thereof are so constructed and arranged that said members are more firmly drawn together as the nut is tightened in use thereof.

A further object of the present invention is the provision of a nut in which the two telescopically related sheet metal members thereof are effectively held against relative rotary movement by inter-fitting apertures and projections with which they are provided, the interlocking of said members being effected as they are endwise assembled in telescopic relation.

A further object of the present invention is the provision of a nut in which the internal threads of the inner sheet metal member are effectively protected from damage by a wrench applied to the outer sheet metal member for nut-turning purposes, the wrench-receiving openings being only in the outer sheet metal member.

A further object of the present invention is the provision of a nut having one or more turning pins rigidly secured to the outer sheet metal member thereof, the securement of said pin or pins to said member being effected prior to the assembly of such member in telescopic relationship with the inner sheet metal member, the headed inner ends of said pins lying in the annular cavity provided between laterally spaced cylindrical wall portions of said inner and outer sheet metal members.

Further objects of the present invention, and many of its practical advantages, will be referred to in or will be evident from the following detailed description of three embodiments of such invention, reference being had to the accompanying drawing, in which Fig. 1 is a top plan view of one form of sheet metal nut embodying the present invention, a portion of the top flange of the inner sheet metal member of the nut being broken away to show the manner in which the turning pins are secured to the outer sheet metal member of the nut;

Fig. 2 is a side view, partly in section and partly in elevation, of said nut, the view being on the line 2—2, Fig. 1;

Fig. 3 is a perspective view of the inner sheet metal member of the nut of Figs. 1 and 2;

Fig. 4 is a similar view of the outer sheet metal member of said nut;

Fig. 5 is a detail vertical sectional view of the nut of Figs. 1 and 2, as viewed from the line 5—5, Fig. 1;

Fig. 6 is a fragmentary top plan view of a slightly modified form of sheet metal nut embodying the present invention;

Fig. 7 is a side view, partly in section and partly in elevation, of the nut of Fig. 6, the view being on the line 7—7, Fig. 6;

Fig. 8 is a fragmentary top plan view of another modified form of sheet metal nut embodying the present invention;

Fig. 9 is a side view, partly in section and partly in elevation, of the nut of Fig. 8, the view being on the line 9—9, Fig. 8; and Fig. 10 is a side view showing the nut of Figs. 1 to 5 inclusive as used for the retention of a bomb fin, the bomb and its fin being fragmentarily shown.

Before the sheet metal nuts here illustrated are specifically described, it is to be understood that the invention here involved is not limited to the details of construction or the specific arrangement of parts herein illustrated or described, as the invention obviously may take other forms. It also is to be understood that the phraseology or terminology herein employed is for the purpose of description and not of limitation, the scope of the present invention being indicated by the appended claims.

Referring first to that form of nut illustrated in Figs. 1 to 5 inclusive, it will be noted that such nut comprises a pair of telescopically related sheet metal members 10 and 11 capable of being rapidly and inexpensively made by simple stamping and forming operations. The inner nut member 10, illustrated per se in Fig. 3, consists of a cylindrical wall 12 and an outwardly turned annular top flange 13, the cylindrical wall 12 being internally threaded (as at 14) throughout its length, as best shown in Fig. 2. The outer nut member 11, illustrated per se in Fig. 4, consists of a lower cylindrical wall 15, an upper cylindrical wall 16 and a transverse annular shoulder 17 therebetween, the diameter of the upper wall 16 being greater than that of the lower wall 15 by the width of the intermediate shoulder 17.

For nut-forming purposes, the two sheet metal members 10 and 11 are assembled in telescopic relationship by relative endwise movement thereof, an assembly which can be easily, quickly and conveniently effected. The relative diameters of the internally threaded cylindrical wall 12 of the inner member 10 and the cylindrical lower wall 15 of the outer member 11 are such as to enable said outer wall 15 to snugly fit upon said inner wall 12, the upper and enlarged cylindrical wall 16 of the outer member being thus spaced from the wall 12 of the inner member, as clearly shown in Fig. 2. From both Figs. 1 and 2, it will be evident that the width of the top flange 13 of the inner member 10 is such as to enable it to snugly fit within the upper cylindrical wall 16 of the outer member 11.

In order to effectively prevent relative rotary movement of members 10 and 11 after their assembly in telescopic relationship, said members are suitably interlocked, the interlocking of said members being accomplished as they are endwise assembled. For the interlocking of such members, the upper cylindrical wall 16 of the outer member 11 is provided in its upper edge with a series (six, as here shown) of circumferentially spaced notches 19, and the annular top flange 13 of the inner member 10 is provided in the plane of said flange with a like series of correspondingly spaced circumferential projections 20. As best shown in Fig. 1, the projections 20 of the inner member 10 snugly fit within the notches 19 of the outer member 11, the depth of such notches corresponding with the thickness of said projections (see Fig. 2) so that the nut flange 13 has a smooth and uninterrupted top surface. Moreover, as the outer ends of the projections 20 are flush with the outer surface of the upper cylindrical wall 16 of the outer member 11, said wall surface is likewise smooth and uninterrupted, as will be evident from Fig. 2.

To interlock members 10 and 11 as they are endwise assembled, it is merely necessary that the notches 19 and the projections 20 be in registry, as will be readily understood. When the projections 20 are seated in the notches 19, relative rotary movement of the two members is effectively prevented, the two members turning as a unit upon the application of a turning force to the outer member. Moreover, as the nut is tightened up in use thereof, the reacting force exerted against the retaining shoulder 17 will cause the two sheet metal members of said nut to be drawn together with increasing firmness, an important feature of the present invention.

In order to enable a turning force to be readily applied to the outer member 11 of the nut, for the application of said nut to, and its removal from a bolt, bushing or other externally threaded element, the upper cylindrical wall 16 of said outer member is provided with a series of circumferentially spaced wrench-receiving openings. In this embodiment of the invention, said openings are in the form of round apertures 21, there being six such apertures as here shown, with an aperture located between (preferably midway between) each two adjacent notches 19. The location of the wrench-receiving apertures 21 in the portions of the wall 16 having the greatest height not only disposes said apertures below the plane of the top flange 13 of the inner nut member 10 but also, enables said apertures to be sufficiently spaced from the upper and lower edges of wall 16 as to avoid any liability of fracture of such wall, adjacent said apertures, in the use of a spanner type wrench in turning the nut, as will be readily understood.

If desired, one or more of the wrench-receiving apertures 21 may have permanently mounted therein a suitable pin or pins for use in turning the nut if a wrench is not readily available. As here shown, two such turning pins 22 are mounted in two diametrically opposed apertures 21, the reduced inner end portions of said pins extending through such apertures and the inner ends of such reduced pin portions being laterally upset, as at 23 (see Figs. 1 and 5), for the permanent mounting of said pins. As will be evident from Fig. 2, there is insufficient space between the top flange 13 of the inner nut member 10 and the intermediate shoulder 17 of the outer nut member 11 for unsetting of the inner ends of the pins toward such nut parts. However, it will be quite evident from Figs. 1 and 5 that there is ample room within the annular cavity 24 within which lie the inner ends of said pins for the lateral upsetting thereof. The mounting of the pins 22 in the wall 16 of the outer nut member 11 is effected, of course, before such member is assembled with the inner nut member 10, the annular cavity 24 providing ample space for the reception of the upset or headed inner ends of said pins, as clearly evident from Fig. 2.

Referring now to Figs. 6 and 7, wherein is illustrated a slightly modified form of sheet metal nut embodying the present invention, it will be noted that such nut differs from the one heretofore described and illustrated in Figs. 1 to 5 inclusive in the character of its wrench-receiving openings. As best shown in Fig. 7, the wrench-receiving openings of the upper cylindrical wall 16a of the outer sheet metal member of the nut of Figs. 6 and 7 are in the form of notches 26, and are located below the notches 19a with which such wall is provided for the reception of the circumferential projections 20a of the top flange 13a of the inner nut member. When the two sheet metal members of this nut are assembled in telescopic relation, the wrench-receiving notches 26 of the outer member are covered by the flange projections 20a of the inner member, said projections being shown as somewhat wider than the corresponding projections 20 of the nut of Figs. 1 to 5 inclusive. Although the nut of Figs. 6 and 7 is here shown as having no turning pins, it is obvious that pins corresponding to the turning pins 22 of the nut of Figs. 1 to 5 inclusive may be mounted in two of the wrench-receiving notches 26 of the nut of Figs. 6 and 7, in the manner heretofore described.

It will be noted that the side walls of the projection-receiving notches 19 of the nut of Figs. 1 to 5 inclusive and the projection-receiving notches 19a of the nut of Figs. 6 and 7 are substantially parallel, as are the side walls of the flange projections 20 and 20a which respectively seat in such notches for interlocking purposes. This enables the formation of such notches to be easily and economically effected by the use of piercing dies or equivalent means, as will be readily understood.

A further difference between the nut of Figs. 6 and 7 and the nut of Figs. 1 to 5 inclusive is that the cylindrical lower wall 15a of the outer member of the nut of Figs. 6 and 7 is provided with an inturned annular flange 27 which underlies and engages the lower end of the internally threaded wall 12a of the inner member of such nut. As clearly shown in Fig. 7, the width of inward extent of the annular flange 27 is somewhat less than the thickness of the threaded wall 12a so that such flange has no contact with the externally threaded element on which the nut is mounted in use thereof. As will be readily understood, as the nut of Figs. 6 and 7 is tightened up in use thereof, the threaded inner member of the nut will engage the inturned annular flange 27 of the outer nut member with increasing firmness, with a corresponding increasing degree of contact of the intermediate shoulder 17a of the nut with the object to be clamped or retained.

Referring now to Figs. 8 and 9, wherein is illustrated another modified form of sheet metal nut embodying the present invention, it will be noted that the telescopically related sheet metal members of such nut are not interlocked and hence, have no interfitting notches and projections as do the nuts heretofore described. In this embodiment of the invention, the outer circumferential edge of the top flange 13b of the inner nut member merely overlies the upper edge of the cylindrical upper wall 16b of the outer nut member, said outer member wall, like the wall 16 of the nut of Figs. 1 to 5 inclusive, being provided with circumferentially spaced wrench-receiving openings in the form of round apertures 21b. To prevent relative turning movement of the two sheet metal members of this nut, when such members are assembled in telescopic relationship as shown in Figs. 8 and 9, brazing or the like is used, the parts of said members which are rigidly connected by brazing or the like preferably being the lower portion of the internally threaded cylindrical wall 12b of the inner member and the lower cylindrical wall 15b of the outer member.

To enable the nut of Figs. 8 and 9 to be readily turned, if a spanner type wrench is not available, a pair of turning pins 22b may be, and here are, mounted in two diametrically opposed wrench-receiving apertures 21b. As clearly shown in Figs. 8 and 9, the pins 22b have reduced inner end portions fitting the apertures 21b through which they extend, and headed inner ends 28 which effect the permanent mounting of said pins in said apertures.

Although nuts embodying the present invention have many uses, Fig. 10 shows, merely for purposes of illustration, the use of one of the present nuts as used for the retention to a bomb 30 of a bomb fin 31. The nut of Fig. 10, designated by the reference letter A and embodying that form of the invention illustrated in Figs. 1 to 5 inclusive, is threaded to an externally threaded bushing 32 or the like projecting rearwardly from the rear end of the bomb 30, the inner end of the nut being spaced from the bomb rear end, as shown. The bomb fin 31 has circumferentially spaced portions 33 engaging the bomb exterior adjacent its rear end, and a centrally apertured disk-like part 34 which overlies the rear end of the bomb, portions 35 of said disk-like part being depresed to engage the rear end of the bomb, as shown. The aperture of said disk-like part 34 is of such size as to receive the reduced cylindrical lower end of the nut A, with the intermediate annular shoulder 17 of the nut overlying said disk-like part for the secure retention of the bomb fin.

As the nut A is tightened on the bomb bushing 32, by the use of a spanner type wrench and the apertures 21 of the nut or by the use of the nut turning pins 22, the two interlocked members of the nut are moved downwardly so as to bring the intermediate annular shoulder 17 of the nut into firm engagement with the bomb fin disk-like part 34. The tighter the nut is drawn down onto the bomb bushing 32, the firmer is the engagement between the interlocking means of the two nut members, as the resistance or reaction force set up by the bomb disk-like part 34 against the nut shoulder 17 tends to urge the outer member of the nut upwardly, all as will be readily understood.

From the foregoing description of three embodiments of the present invention, it will be evident that sheet metal nuts embodying said invention are of simple and inexpensive form, of light weight, and of strong and sturdy character. Inasmuch as the wrench-receiving openings of the nuts are only in the outer members thereof, in walls which are spaced from the internally threaded walls of the inner nut members, there is no liability of damage to such threads by spanner type wrenches cooperating with said openings for nut-turning purposes. In each embodiment of the invention here illustrated, the outer member of the nut is overlapped at its upper end by portions of the inner nut member, and inasmuch as the outer member is normally urged upwardly with respect to the inner member, by the reacting force exerted by the object being clamped against the annular intermediate shoulder of the outer nut member, the nut is more or less of self-locking character. The interlocking means of the nuts of Figs. 1 to 7 inclusive are of particularly effective character, and to interlock the two members of each of those nuts, it is merely necessary that their complementary notches and projections be in registry as the members are endwise assembled in telescopic relationship, as heretofore pointed out. If desired, the inturned annular flange 27 of the nut of Figs. 6 and 7 may be omitted and conversely, either the nut of Figs. 1 to 5 inclusive or the nut of Figs. 8 and 9 may be provided, if desired, with such an inturned annular flange, all as will be readily understood.

To those skilled in the art to which the present invention relates, further features and advantages of sheet metal nuts embodying such invention will be evident from the foregoing description of three embodiments thereof.

What we claim is:

1. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having portions thereof underlying and in contact with the top flange of said inner member, and means for preventing relative rotary movement of said telescopically related members.

2. A sheet metal nut, comprising inner and outer telescopically related sheet metal members, the inner member having an internally threaded cylindrical wall and an outwardly turned top flange, the outer member having a lower cylindrical wall sleeved upon the internally threaded cylindrical wall of the inner member, an outwardly turned intermediate shoulder of annular form, and an upper cylindrical wall spaced from the cylindrical wall of said inner member by the width of said intermediate shoulder and having portions thereof underlying and in contact with the top flange of said inner member, and means for preventing relative rotary movement of said telescopically related members.

3. A sheet metal nut, comprising inner and outer telescopically related sheet metal members, the inner member having an internally threaded tubular portion and an outwardly turned top flange, the outer member having a side wall with an inwardly turned portion engaging the internally threaded tubular portion of the inner member, the side wall of said outer member being in contact with the top flange of said inner member, and means for preventing relative rotary movement of said telescopically related members, the side wall of said outer member being provided with means to enable the nut to be readily turned in its application and removal.

4. A sheet metal nut, comprising inner and outer telescopically related sheet metal members, the inner member having an internally threaded cylindrical wall and an outwardly turned top flange, the outer member having a lower cylindrical wall sleeved upon the internally threaded cylindrical wall of the inner member, an outwardly turned intermediate shoulder of annular form, and an upper cylindrical wall spaced from the cylindrical wall of said inner member by the width of said intermediate shoulder and having portions thereof underlying and in contact with the top flange of said inner member, and means for preventing relative rotary movement of said telescopically related members, the upper cylindrical wall of said outer member being provided with circumferentially spaced wrench-receiving openings to enable the nut to be readily turned in its application and removal.

5. A sheet metal nut, comprising inner and outer telescopically related sheet metal members, the inner member having an internally threaded cylindrical wall and an outwardly turned upper flange, the outer member having a lower wall sleeved upon the internally threaded cylindrical wall of the inner member, an outwardly turned intermediate shoulder, and an upper wall having notches for the reception of projections with which the top flange of said inner member is provided, whereby relative rotary movement of said telescopically related members is prevented.

6. A sheet metal nut, comprising inner and outer telescopically related sheet metal members, the inner member having an internally threaded tubular portion and an outwardly turned upper flange, the outer member having a side wall with an inwardly turned portion engaging the internally threaded tubular portion of the inner member, the side wall of said outer member being provided with notches for the reception of projections with which the upper flange of said inner member is provided, whereby relative rotary movement of said telescopically related members is prevented.

7. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having circumferentially spaced notches to receive correspondingly spaced projections of the top flange of the inner member as the inner and outer members are telescopically related, whereby relative rotary movement of said telescopically related members is prevented.

8. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having circumferentially spaced notches for the reception of projections with which the top flange of the inner member is provided in the plane of such flange, whereby relative rotary movement of said telescopically related members is prevented.

9. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having circumferentially spaced notches for the reception of projections with which the top flange of the inner member is provided in the plane of such flange, whereby relative rotary movement of said telescopically related members is prevented, the top wall of said outer member being also provided below the plane of the top flange of said inner member with circumferentially spaced openings for use in turning the nut in its application and removal.

10. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper cylindrical wall having notches in its upper edge portion for the reception of projections with which the top flange of said inner member is provided, whereby relative rotary movement of said telescopically related members is prevented, the upper wall of said outer member being also provided below at least two of said projection-receiving notches with wrench-receiving notches to enable the nut to be readily turned in its application and removal, the wrench-receiving notches being closed at the top by the projections of the top flange of the inner member.

11. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper cylindrical wall having portions thereof underlying and in contact with the top flange of said inner member, means for preventing relative rotary movement of said telescopically related members, the upper wall of said outer member being provided with circumferentially spaced wrench-receiving openings to enable the nut to be readily turned in its application and removal by a spanner type wrench, and a turning pin permanently mounted in one of said openings to enable the nut to be turned if a wrench is not available.

12. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall spaced from the cylindrical wall of the inner member and having portions thereof underlying and in contact with the top flange of said inner member, means for preventing relative rotary movement of said telescopically related members, the upper wall of said outer member having two circumferentially spaced openings, and a turning pin permanently mounted in each of said openings to enable the nut to be readily turned in its application and removal, said pins having headed inner ends lying within the space provided between the upper wall of said outer member and the internally threaded cylindrical wall of the outer member.

13. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having circumferentially spaced notches diametrically opposed in pairs and the top flange of said inner member having corresponding projections seated within and fitting said notches, whereby relative rotary movement of said telescopically related members is prevented.

14. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having circumferentially spaced notches diametrically opposed in pairs and the top flange of said inner member having corresponding projections seated within and fitting said notches, whereby relative rotary movement of said telescopically related members is prevented, the side walls of each of said notches and the side edges of the projection seated within and fitting the same being generally parallel.

15. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having circumferentially spaced notches for the reception of projections with which the top flange of said inner member is provided, whereby relative rotary movement of said telescopically related members is prevented, the upper wall of said outer member also being provided with circumferentially spaced wrench-receiving apertures to enable the nut to be readily turned in its application and removal, the notches and the apertures of the upper wall of said outer member being alternately spaced.

16. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall spaced from the cylindrical wall of said inner member and having portions thereof underlying and in contact with the top flange of said inner member, means for preventing relative rotary movement of said telescopically related members, the upper wall of said outer member having a pair of circumferentially spaced openings, a turning pin mounted in each of said openings to enable the nut to be readily turned in its application and removal, the inner end portion of each of said pins lying in the space between walls of the inner and outer members and engaging the top flange of the inner member and the intermediate shoulder of the outer member, and circumferentially extending means carried by the inner end of each of said pins for permanently anchoring said pin in its opening.

17. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall spaced from the cylindrical wall of said inner member and having portions thereof underlying and in contact with the top flange of said inner member, means for preventing relative rotary movement of said telescopically related members, the upper wall of said outer member having a pair of circumferentially spaced openings, a turning pin mounted in each of said openings to enable the nut to be readily turned in its application and removal, the inner end portion of each of said pins lying in the space between walls of the inner and outer members and engaging the top flange of the inner member and the intermediate shoulder of the outer member, the inner end of each of said pins being laterally upset to effect its permanent securement in its opening.

18. A sheet metal nut, comprising inner and outer telescopically related sheet metal members, the inner member having an internally threaded cylindrical wall and an outwardly turned top flange, the outer member having a lower wall sleeved upon the internally threaded cylindrical wall of the inner member, an outwardly turned intermediate shoulder, and an upper wall having portions thereof underlying and in contact with the top flange of said inner member, the lower wall of said outer member having an internal flange underlying and engaging the lower end of the internally threaded wall of said inner member, and means for preventing relative rotary movement of said telescopically related members.

19. A sheet metal nut, comprising inner and outer sheet metal members, the inner member having an internally threaded tubular portion and an outwardly turned portion, the outer member having a tubular portion surrounding the tubular portion of said inner member and also having an outwardly turned portion disposed below the outwardly turned portion of said inner member, the outwardly turned portion of one of said members having a peripheral notch and the outwardly turned portion of the other member having a projection extending into said notch to thereby interlock said members from relative rotary movement.

20. A sheet metal nut, comprising inner and outer sheet metal members, the inner member having an internally threaded tubular portion and an outwardly turned portion, the outer member having a tubular portion surrounding the tubular portion of said inner member and also having an outwardly turned portion disposed below the outwardly turned portion of said inner member, the outwardly turned portion of one of said members having an aperture and the outwardly turned portion of the other member having a projection extending into said aperture to thereby interlock said members from relative rotary movement.

RUDOLPH I. SCHONITZER.
HAROLD B. MUSTER.